A. COLLETTE.
SPRING ATTACHMENT FOR VEHICLE SPRINGS.
APPLICATION FILED FEB. 24, 1913.
1,128,587.
Patented Feb. 16, 1915.
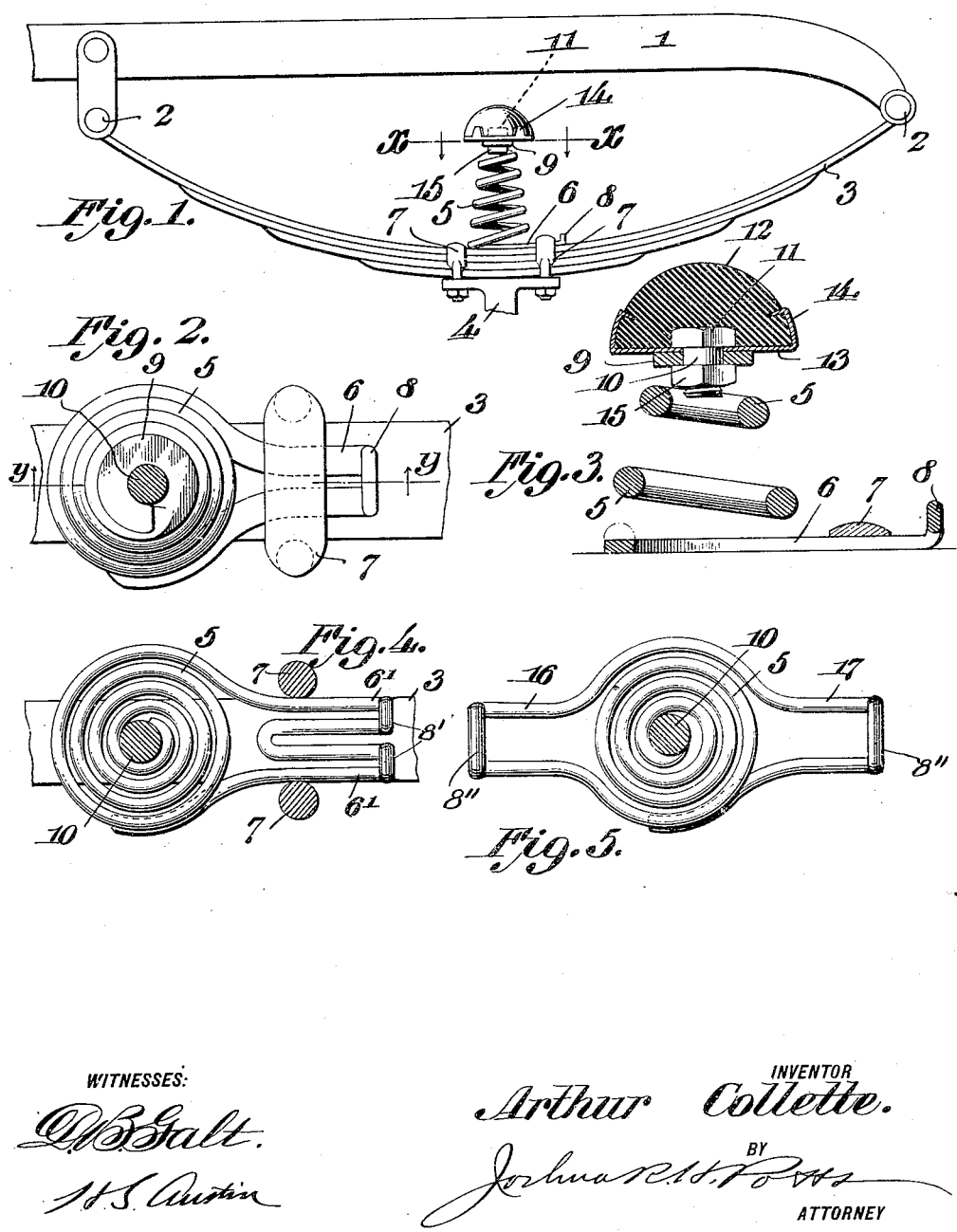

UNITED STATES PATENT OFFICE.

ARTHUR COLLETTE, OF BROCKTON, MASSACHUSETTS.

SPRING ATTACHMENT FOR VEHICLE-SPRINGS.

1,128,587.     Specification of Letters Patent.     Patented Feb. 16, 1915.

Application filed February 24, 1913. Serial No. 750,219.

*To all whom it may concern:*

Be it known that I, ARTHUR COLLETTE, a citizen of the United States, residing at Brockton, county of Plymouth, and State of Massachusetts, have invented certain new and useful Improvements in Spring Attachments for Vehicle-Springs, of which the following is a specification.

This invention relates to shock absorbers, and may be more particularly identified with that class of devices as are commonly used in connection with vehicle springs.

The primary object of my invention, is to provide an auxiliary attachment for vehicle springs, for the purpose of relieving the vehicle springs of any violent strains when the vehicle is traveling over rough roads.

A further object of my invention is to provide a device of such construction as to obviate the violent rebound of a vehicle body, which commonly occurs when the vehicle is precipitated suddenly in a rut or hole in the road.

A still further object of my invention, is to provide a device of the class described, which may be easily and quickly applied to a vehicle in the event of any of the springs upon the vehicle being broken, and which will temporarily prove an efficient substitute for the usual vehicle spring.

With these objects in view, together with others which will appear as the nature of the invention is better understood, my invention comprises a resilient member, which is adapted to be inserted within an elliptical or semielliptical vehicle spring, to relieve the vehicle spring of the severe strain incident to travel over rough roads, and which also, through its novel construction, obviates the incessant noise which usually accompanies such strains.

My invention further consists in a resilient member, shown in the present instance in connection with a semielliptical vehicle spring, which, under normal conditions, is inactive and free from engagement with the vehicle body, but which is immediately operative to accomplish the desired result when the vehicle encounters rough uneven roads.

In the drawings forming a part of this specification Figure 1 is a side elevation of a portion of a vehicle body and spring, and in which is illustrated my improved shock absorbing attachment. Fig. 2 is a horizontal section taken upon the line *x*—*x* of Fig. 1, showing my device upon an enlarged scale. Fig. 3 is a fragmentary vertical section taken upon the line *y*—*y* of Fig. 2. Fig. 4 is a plan view of a modified form of the resilient member used in connection with my device, and Fig. 5 is a view similar to Fig. 4 showing a further modification.

Referring now more particularly to the drawings, 1 represents generally a vehicle body, mounted through the knuckles 2 of the spring 3 upon the vehicle axle 4. The vehicle body, springs and axle, forming no part of my invention, and being shown only for the purpose of illustrating the application of my improved device, may be of any of the usual well known constructions, a spring of the semi-elliptical type being shown in the present instance.

My improved shock absorbing device consists generally of means interposed between the axle and the body of the vehicle, for relieving the vehicle springs of excessive strains and shocks when the said vehicle receives severe jolts, and comprises a resilient member 5 in the form of a coil spring. This member is preferably conical in shape, the lowermost coil of which is adapted to rest upon and be secured to the spring or axle, while the upper end, or apex, is adapted to support a substantially soft resilient pad or buffer to deaden the noise when contacted by the vehicle body. It is obvious that on account of the vibration of the axle, and also on account of the blows received by the shock absorber, it is necessary to provide a substitute base for the spring 5, and means for securely holding the same in position. To this end I flatten the lowermost coil of the spring, bringing the entire convolution into substantially the same plane, and extending a portion of the convolution to form a radially disposed arm 6 and over which is adapted to fit one of the clips or U-bolts 7 of the vehicle spring 3. The end 8 of the arm 6 is turned upwardly to form a retaining member to prevent the coil spring from accidentally working out in the event of the U-bolt becoming loose. The upper end or apex of the coil spring is formed at 9 to inclose the shank 10 of a retaining bolt 11, for securing the buffer 12 in position. The buffer may be formed of any resilient non-abrasive material, rubber being employed in the present instance, and is secured upon a plate 13 by the retaining members 14. The bolt 11 passes through the central portion of this plate and through the upper coil 9 of the spring 5, to be held rigidly thereto by the nut 15. This improved shock absorbing device as will be observed is thus securely held in position upon the axle or vehicle spring, and extends upwardly therefrom, terminating substantially below the wagon body 1.

When the vehicle is traveling over smooth roads the elliptical springs 3 will bear all of the weight of the vehicle body and will be sufficient to absorb all of the gentle vibrations of the axle but when the course of the vehicle is over uneven roads, the vibrations of the heavy vehicle body will cause the springs 3 to flatten or straighten out considerably and in the downward movement of the body, the shock absorbing device is contacted and further lower movement thereof is arrested. Thus the danger of broken springs is entirely eliminated as the improved shock absorbing device prevents the vehicle body from assuming a position close enough to the axle to subject the vehicle springs to such severe strain. The interposition of the auxiliary coil spring between the axle and vehicle body, also, in arresting the downward movement of the vehicle body, prevents the violent rebound of the vehicle body, which is so dangerous to the springs used in connection with vehicles of this type.

Fig. 4 of the drawings illustrates a slightly modified form of my invention, and in which is shown the downwardly extending arm 6' rebent upon itself at different points, to form a substantially larger engaging surface for the U-bolts 7, and the outer longitudinally extending resilient portions of which are adapted to yieldingly engage the U-bolt to prevent any lateral movement of the shock absorber should the U-bolt become loose. The ends of the arm 6' are bent upwardly as at 8' in a manner similar to that in the preferred form of the device to doubly insure against accidental displacement of the device.

Fig. 5 illustrates a further modification of the manner in which the lowermost coil of the spring 5 may be constructed, to form a more extensive base, and whereby it may be more efficiently secured to the running frame of the vehicle. This form illustrates the lower coil formed into arms 16 and 17, extending in directions diametrically opposite from the coil spring 5 and being bent upwardly as at 8'' adjacent their extreme ends as in the above described forms of the invention. The purpose of this construction is obvious, since the oppositely extending arms may each be held securely in position upon the spring 3, by the U-bolt 7, and hence lend more rigidity and firmness to the coil spring 5.

While in this specification and drawings I have described and illustrated my device in its simplest and most concise forms, I wish it to be understood that I need not necessarily restrict myself to the exact forms set forth, but may make such minor changes and alterations therein as may fairly fall within the scope of my claims.

Having thus described my invention what I claim as new and desire to secure by Letters Patent is:

1. In a vehicle having the usual body, axle and interposed spring, a coil spring mounted adjacent said spring and extending vertically therefrom, the lowermost coil of said coil spring being flattened and extended to form an arm, means upon said vehicle spring for detachably engaging said arm, the end of said arm being turned up whereby said engaging means will be prevented from becoming accidentally disengaged therefrom, and a buffer mounted upon the opposite end of said coil spring, substantially as described.

2. In a vehicle having the usual body, axle, and interposed spring, said interposed spring being secured to said axle by U-bolts, a coil spring mounted upon said spring and extending vertically therefrom the lowermost coil of said coil spring being extended to form an arm to be engaged by said U-bolt, means upon said arm whereby said U-bolt will be prevented from becoming accidentally disengaged therefrom, and a buffer mounted upon the opposite end of said coil spring, substantially as described.

3. In a vehicle having the usual body, axle, and interposed spring secured to said axle by U-bolts, a coil spring mounted upon said spring and extending vertically therefrom the lowermost coil of said coil spring being extended therefrom and rebent upon itself to form a spring arm for engagement beneath said U-bolt, means upon said spring arm to prevent said coil spring from becoming disengaged from said U-bolt, and a buffer mounted upon the opposite end of said coil spring, substantially as described.

4. In a vehicle having the usual body, axle, and interposed spring secured to said axle by U-bolts, a cone shaped coil spring mounted upon said spring and extending vertically therefrom, the lowermost coil of said coil spring being greater in diameter than the width of said interposed spring and being extended and bent upon itself to form a spring arm of such dimension laterally as to yieldingly engage the shanks of said U-bolt when secured thereunder, substantially as described.

5. In a vehicle having the usual body, axle and interposed spring, a coil spring mounted adjacent said spring and extending vertically therefrom, the lowermost coil of said coil spring being bent to present oppositely extending arms, means upon said vehicle spring for detachably engaging said arms, the ends of said arms being turned up whereby said engaging means will be prevented from becoming accidentally disengaged therefrom, and a buffer mounted upon the opposite end of said coil spring, substantially as described.

In testimony whereof I have signed my name to this specification in the presence of two subscribing witnesses.

ARTHUR COLLETTE.

Witnesses:
GEORGE W. FOLSOM, Jr.,
GELOSE COLLETTE.

Copies of this patent may be obtained for five cents each, by addressing the "Commissioner of Patents, Washington, D. C."